United States Patent [19]
Trzmiel et al.

[11] Patent Number: 5,109,813
[45] Date of Patent: May 5, 1992

[54] CHAIN DRIVE TENSIONING AND ADJUSTING ARRANGEMENT

[75] Inventors: Alfred Trzmiel, Grafenberg; Olaf Fiedler, Pforzheim; Johannes Weyandt, Illingen, all of Fed. Rep. of Germany

[73] Assignees: Dr. Ing. h.c.F. Porsche AG, Fed. Rep. of Germany; Hydraulik-Ring GmbH, Fed. Rep. of Germany

[21] Appl. No.: 663,603

[22] Filed: Mar. 4, 1991

[30] Foreign Application Priority Data

Jul. 26, 1990 [DE] Fed. Rep. of Germany ....... 4023727

[51] Int. Cl.⁵ .............................. F01L 1/34; F01L 1/04
[52] U.S. Cl. ................................. 123/90.15; 123/90.17; 123/90.31; 474/110; 474/111
[58] Field of Search ............... 123/90.15, 90.17, 90.31; 474/110, 111, 117, 138

[56] References Cited

U.S. PATENT DOCUMENTS

| | | | |
|---|---|---|---|
| 3,888,217 | 6/1975 | Hisserich | 123/90.15 |
| 4,484,543 | 11/1984 | Maxey | 123/90.15 |
| 4,685,429 | 8/1987 | Oyaizu | 123/90.15 |
| 4,726,331 | 2/1988 | Oyaizu | 123/90.15 |
| 4,862,845 | 9/1989 | Butterfield et al. | 123/90.15 |
| 4,872,426 | 10/1989 | Sapienza | 123/90.17 |

FOREIGN PATENT DOCUMENTS

| | | | |
|---|---|---|---|
| 3506106 | 8/1985 | Fed. Rep. of Germany ... | 123/90.15 |
| 3509094 | 10/1985 | Fed. Rep. of Germany ... | 123/90.15 |
| 2106927 | 5/1972 | France .............................. | 123/90.15 |
| 140807 | 6/1988 | Japan ............................... | 123/90.15 |
| 0651109 | 8/1985 | Switzerland ..................... | 123/90.15 |

Primary Examiner—E. Rollins Cross
Assistant Examiner—Weilun Lo
Attorney, Agent, or Firm—Evenson, Wands, Edwards, Lenahan & McKeown

[57] ABSTRACT

An arrangement and method for the hydraulic tensioning and adjusting of a camshaft chain drive has a chain which winds around both camshafts. Together with its tensioning arrangement, the chain is shifted into its transverse direction. The load end of the chain is thus lengthened, and the loose end of the chain is shortened, or vice versa. Engine oil can be used as the hydraulic fluid. The fluid pressure rises with the rotational engine speed and is used either directly or by way of a control slide valve for adjustment of the tensioning arrangement.

6 Claims, 3 Drawing Sheets

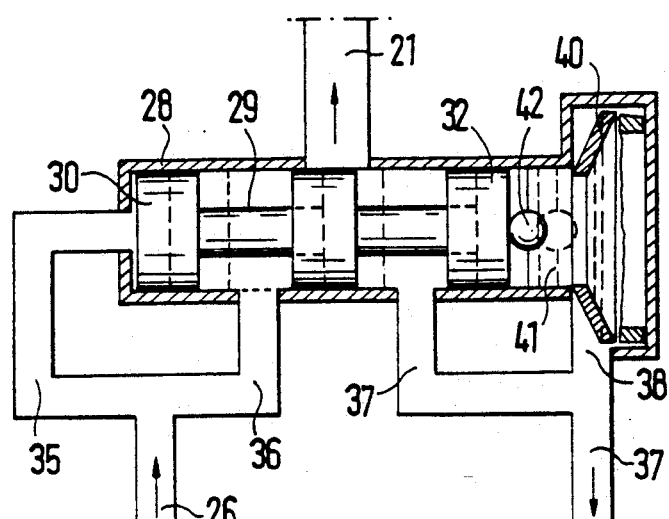
FIG.6
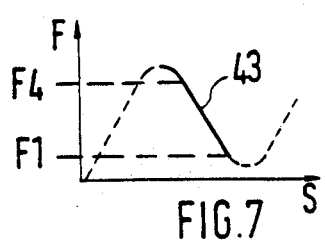
FIG.7
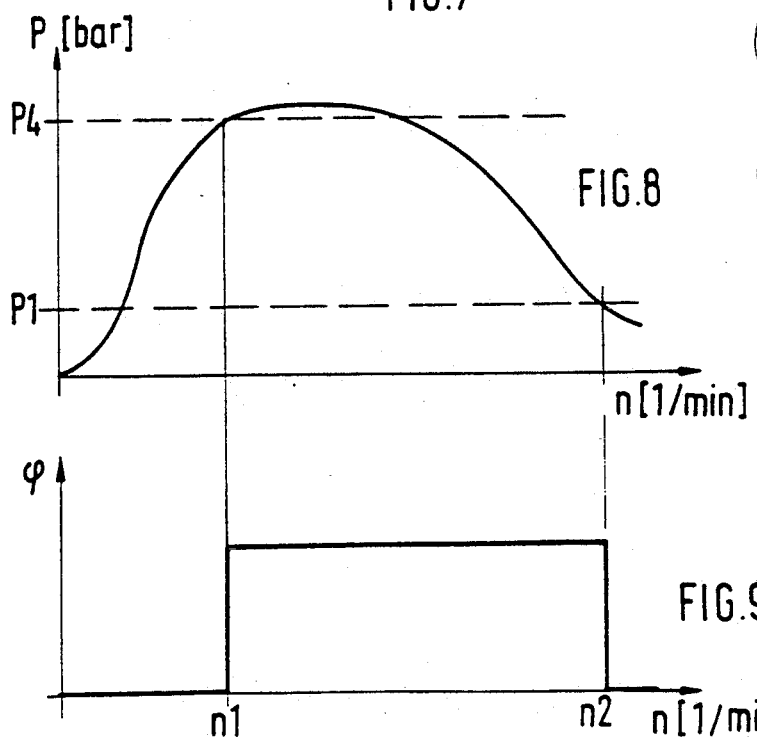
FIG.8
FIG.9
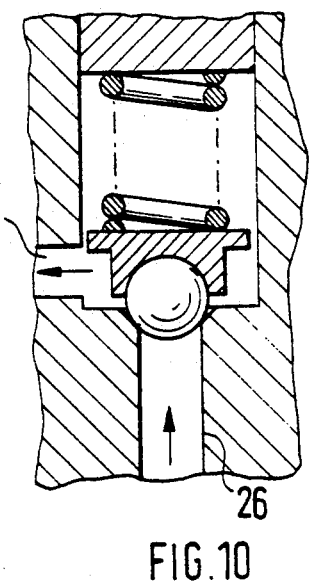
FIG.10

CHAIN DRIVE TENSIONING AND ADJUSTING ARRANGEMENT

BACKGROUND AND SUMMARY OF THE INVENTION

The present invention relates to an arrangement and method for the tensioning and adjusting of a camshaft chain drive and, more particularly, to an arrangement by means of which a camshaft of a piston internal-combustion (IC) engine drives a second camshaft, with the relative rotational position of the camshafts being changed by adjustment of the chain with a hydraulic piston.

A tensioning and adjusting arrangement is described in P 40 06 910.9. A hydraulic tensioning device for a chain enclosing the two camshafts of an internal-combustion engine comprises two hydraulic pistons which are concentrically guided in one another. A spring, which is centrically arranged between the hydraulic pistons, shifts the hydraulic pistons in opposite directions with respect to one another and places the tensioning shoes fastened to their ends against the chain. When the hydraulic pistons are acted upon by hydraulic pressure, the tensioning arrangement is shifted transversely with respect to the chain so that the relative rotational position of the inlet camshaft to the outlet camshaft will change by the shortening of the loose end and the lengthening of the load end. Thus, the control time of the inlet valves is changed. A control slide valve, which is longitudinally slidable via an electromagnet and controls the pressure feeding ducts to the tensioning device, is used for controlling the hydraulic pressure.

It is a object of the present invention to simplify the known tensioning and adjusting arrangement and method, and thereby also reduce its manufacturing costs.

The foregoing object has been achieved by using engine oil as the hydraulic fluid. Since the engine oil pressure rises with the rotational speed of the engine, the adjusting arrangement can be actuated as a function of the rotational speed of the engine without requiring an electromagnet. In addition, the external control of the electromagnet may also be eliminated. Hence, the arrangement can be manufactured at low cost.

In a first embodiment of the present invention, the engine oil pressure directly affects the hydraulic piston which, from the direction of the other side, is braced by a spring. An equilibrium occurs at the hydraulic piston between the product of the piston surface times engine oil pressure and the spring force acting from the other side. Since the engine oil pressure rises with the rotational speed, a specific engine rotational speed corresponds to a defined deflection of the hydraulic piston and thus to a specific adjustment of the inlet camshaft to the outlet camshaft.

In a second embodiment of the present invention, the engine oil pressure is in contact with a control member which is braced by a spring and can be moved longitudinally in a housing bore and from which a duct leads to the hydraulic piston. As the engine oil pressure increases, the control member is slid farther along until it exposes the duct to the hydraulic piston. Starting here, the full oil pressure then affects the hydraulic piston and shifts it into the maximal adjusting position. If the oil pressure is lowered again, the hydraulic piston returns to the starting position. As tests have shown, this simple 2-point control is capable of significantly increasing the engine torque in the lower rotational speed range and of increasing the performance.

BRIEF DESCRIPTION OF THE DRAWINGS

These and further objects, features and advantages of the present invention will become more readily apparent from the following detailed description of presently preferred embodiments when taken in conjunction with the accompanying drawings, wherein:

FIG. 6 is a control slide valve with a disk spring in accordance with another embodiment of the present invention;

FIG. 7 is a force - deflection diagram concerning FIG. 6;

FIG. 8 is a pressure rotational speed diagram concerning FIG. 6;

FIG. 9 is a torsion angle - rotational speed diagram concerning FIG. 6; and

FIG. 10 is a ball switch valve.

DETAILED DESCRIPTION OF THE DRAWINGS

Figure 1:
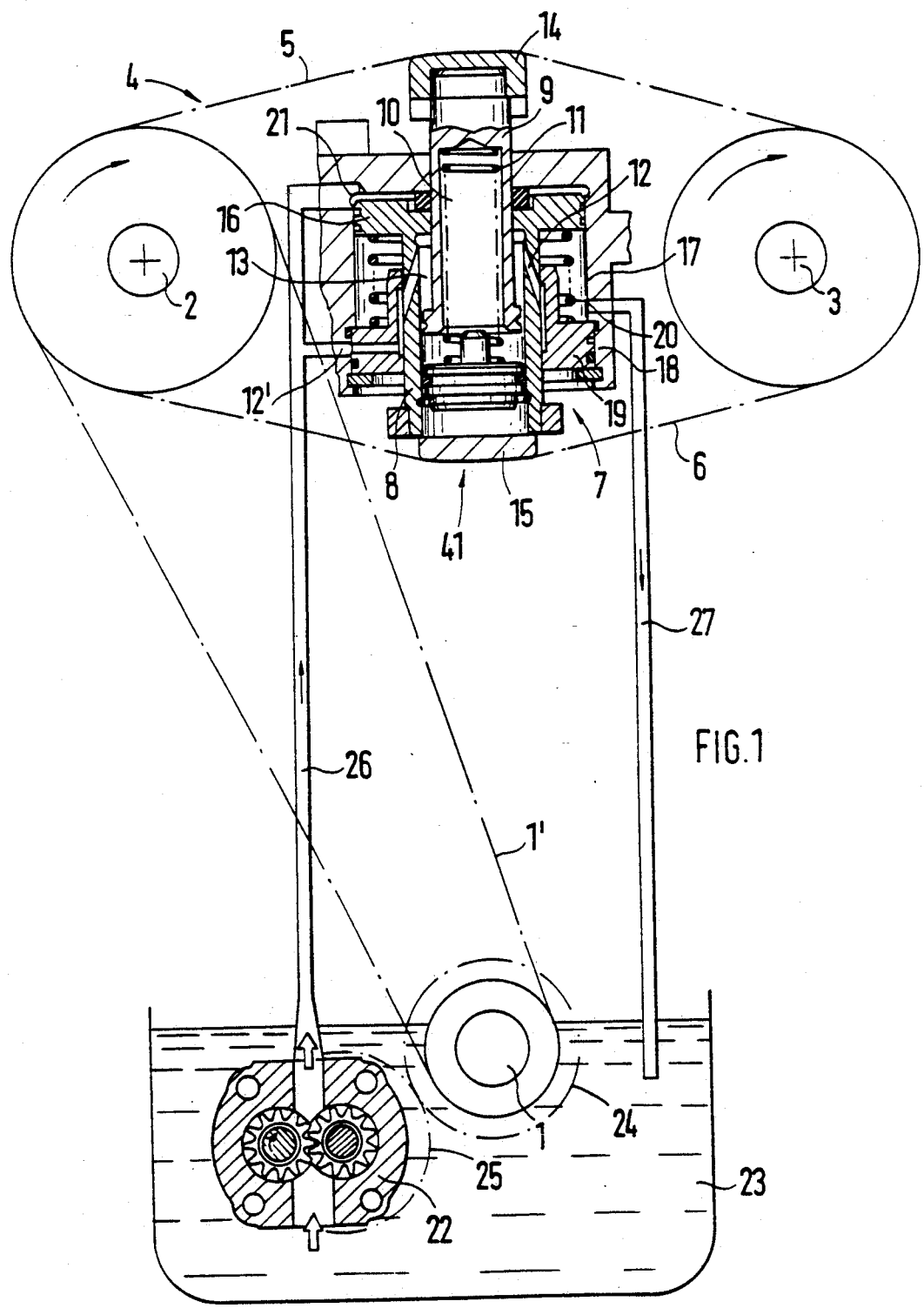
FIG. 1 is a schematic representation of a camshaft drive with a tensioning and adjusting arrangement in accordance with the present invention.

A crankshaft 1 of an internal-combustion engine, by way of toothed belt or a chain 1' shown in dot-dash or phantom lines, drives an outlet camshaft 2 actuating outlet valves. Through a chain 4 or the like, an outlet camshaft 2 drives an inlet camshaft 3 controlling inlet valves. A hydraulic tensioning arrangement designated generally by the numeral 7 is applied to the load end 5 and the loose end 6 of the chain from the direction of the interior side of the chain 4.

The tensioning arrangement 7 comprises a hollow exterior hydraulic piston 8, an interior hollow hydraulic piston 9 which is longitudinally guided in the exterior hydraulic piston 8, and a coil compression spring 11 which is braced in the hollow space 10 between the two hydraulic pistons 8, 9. In addition to the force of the coil compression spring 11, the hydraulic pistons 8, 9 are acted upon by hydraulic pressure by way of a pressure connection 12 on an annular space 13 between the two hydraulic pistons 8, 9. The hydraulic pressure is supplied from the duct 12' connected to the lubricant circulating system of the engine. A tensioning shoe 14 is fastened on the interior hydraulic piston 9 and is applied to the load end 5 of the chain 4. A tensioning shoe 15 is fastened on the end side in the exterior hydraulic piston 8 and presses on the loose end 6 of the chain 4. On the other end of the exterior hydraulic piston 8, a collar 16 is provided and is longitudinally, sealingly guided in a bore 17 of the housing 18.

A coil compression spring 20 is braced between the collar 16 and a guiding sleeve 19 fastened in the housing 18. A second pressure connection 21 is located on the front side on the collar 16 of the hydraulic piston 8 through which engine oil pressure is supplied to the tensioning arrangement 7. When the engine oil pressure changes, the tensioning arrangement 7, as a whole, is shifted transversely with respect to the load end 5 and the loose end 6 so that the loose end is shortened and the load end is lengthened, or vice versa. In this manner, the inlet camshaft 3 is rotated with respect to the outlet camshaft for changing the valve control times.

Figure 3:
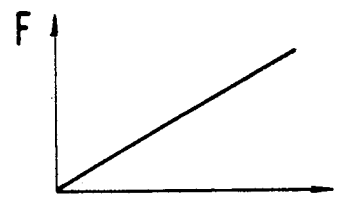
FIG. 3 is a force - deflection diagram concerning FIG. 2.

In the embodiment of the invention shown in FIG. 1, the engine oil pressure acts directly on the hydraulic piston 8 causing the camshaft adjustment. The engine oil pressure is generated by a gear wheel pump 22 which is arranged in the engine oil pan 23 and is driven by the crankshaft 1 by way of a pair of spur wheels 24, 25. The gear wheel pump 22 is connected, through a pressure line 26, with the duct 12' or the first pressure connection 12 used for the tensioning, as well as with the second pressure connection 21 by way of which the camshaft adjustment takes place. As the rotational speed of the crankshaft 1 increases, the gear wheel pump 22, which delivers against the hydraulic piston 8, generates a correspondingly rising oil pressure so that the hydraulic piston 8 and therefore the entire tensioning arrangement 7 is shifted. The corresponding force - deflection diagram of such shifting is illustrated in FIG. 3, wherein F indicates the spring force and represents the spring deflection. Since the same oil pressure, via the pressure connection 12, also acts on the rear of the hydraulic piston, the tensioning of the chain is fully maintained during the adjustment. In a return flow line 27, oil is returned from the adjusting arrangement into the oil pan 23 shown in FIG. 1.

Figure 2:
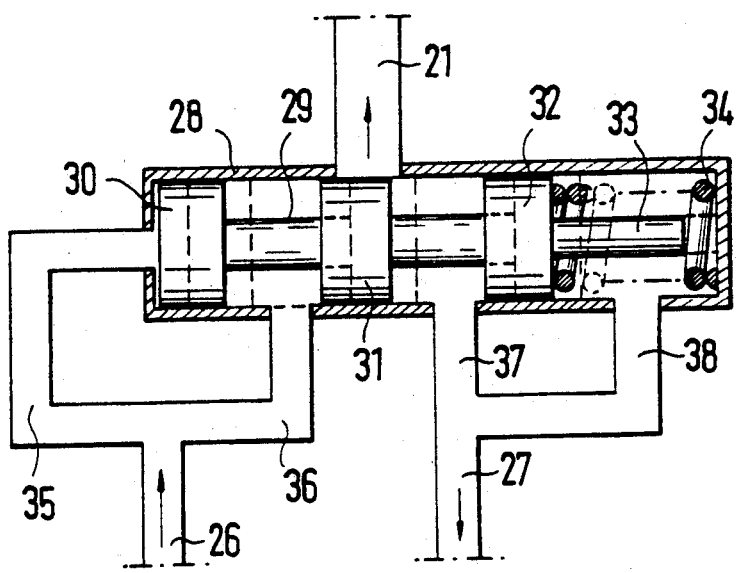
FIG. 2 is control housing with a control slide valve according to a second embodiment of the present invention.

A second embodiment of the invention is illustrated in FIG. 2 where the pressure line 26 starting out from the gear wheel pump 22 is connected to a control housing 28 in which a control slide valve 29 is longitudinally guided. The control slide valve 29 has a front-side piston 30, a central control piston 31 and a guiding piston 32, all three pistons 30, 31, 32 being rigidly connected with one another through a central rod. A pin 33 is mounted on the front side of the guiding piston 32 and projects into a coil spring 34 braced between the guiding piston 32 and the control housing 28.

In the region of the control housing 28, the pressure line 26 branches into a line 35 which acts upon the piston 30 on the front side and a line 36 which leads to the rear of the piston 30. Return lines 37 and 38 start out from both front sides of the guide piston 32 and combine to form the common return flow line 27.

Figure 4:
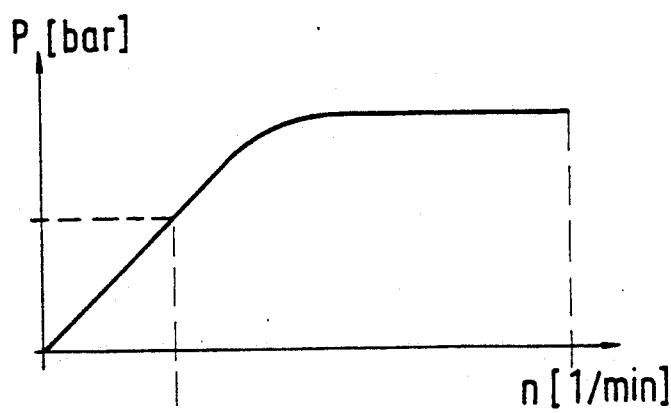
FIG. 4 is a pressure rotational speed diagram concerning FIG. 2.
Figure 5:
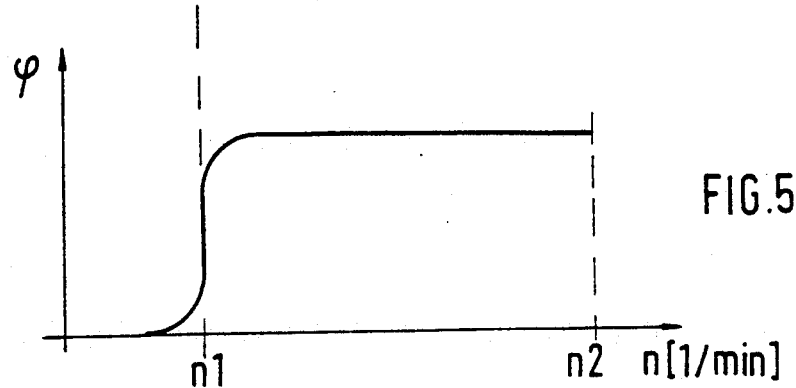
FIG. 5 is a torsion angle - rotational speed diagram concerning FIG. 2.

The duct 21, which is used for the adjusting of the tensioning arrangement 7, is controlled by the central control piston 31 in the embodiment of FIG. 2. The oil pressure which is fed by way of the pressure line 26 shifts the control slide valve 29, while further bracing the coil spring 34, until the control piston 31 exposes the duct 21 and, in the position drawn by an interrupted or dash line, the pin 33 comes to rest on the control housing 28. As shown in FIG. 4, the pressure acting upon the tensioning arrangement 7 rises continuously with the rotational engine speed n and, when the rotational engine speed is increased further, is held at a constant level. At the rotational speed n1, a connection is created between the line 36 and the duct 21, and the full oil pressure acts upon the hydraulic piston 8. As illustrated in FIG. 5, the torsion angle $\phi$ of the inlet camshaft 4 changes abruptly in this case.

In the embodiment of the present invention illustrated in FIG. 6, the control slide valve 29 is supported on the control housing 28 by a disk spring 40, where a thrust piece 41 and a ball 42 rest against the guide piston 32. FIG. 7 shows the corresponding force -deflection diagram of the disk spring 40 of FIG. 6. The linearly descending segment 43 of the curve in FIG. 7 is used for the control. In FIG. 8, a pressure P4 of approximately 4 bar corresponds to the upper switch point in the case of the force F4 in FIG. 7; a pressure P1 of approximately 1 bar corresponds to the lower switch point at F1. When the pressure rises, the upper switch point is reached first. Since the disk spring 40 operates on the negatively descending curve segment 43, this switching condition is maintained until the pressure is lowered below 1 bar. Thus a defined 2-point switching is obtained for the torsion angle $\phi$ of the inlet camshaft 4. As illustrated in FIG. 9, the pertaining switching diagram for the torsion angle $\phi$ of the FIG. 6 embodiment is exactly rectangular because of the tilting effect of the disk spring.

Instead of a control slide valve, a ball switch valve may be used, as it is shown in the further embodiment of FIG. 10. In this case, a valve seat 44 is constructed in the pressure line 26 against which a ball 45 is pressed by way of a thrust piece 46 by means of a coil spring 47 which is supported on the control housing. Starting from a specific oil pressure in the pressure line 26, the ball 45 lifts off the valve seat 44 and releases the path to the duct 21 by way of which the tensioning arrangement 7 is acted upon by the full oil pressure.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A method for hydraulic tensioning and adjustment of a drive of an internal-combustion engine, comprising the steps of:
   supplying engine oil directly on a hydraulic piston under a spring prestress to shift the hydraulic piston continuously against the spring prestress at a pressure which rises with rotational engine speed;
   shifting a tensioning device transversely to the drive via the hydraulic piston so that one of a load end and a loose end of the drive is lengthened and the other of the load end and the loose end is shortened; and
   changing a rotational position of a first camshaft of the drive relative to a second camshaft of the drive for changing valve control timing.

2. An arrangement for hydraulic tensioning and adjusting of a wind-around drive through which a first camshaft of a piston internal-combustion engine drive a second camshaft, comprising a hydraulic piston for changing the relative rotational position of the camshafts with respect to one another by adjustment of the drive by shifting a chain tensioning device transversely to the drive, while one of a loose end and a load end of the drive is lengthened and the other of the loose end of the load end is shortened, wherein engine oil is used as hydraulic fluid for the hydraulic piston, and pressure of the fluid rises with rotational engine speed, and engine oil pressure acts directly on the hydraulic piston which is under a spring prestress and shifts the hydraulic piston continuously against the spring prestress corresponding to the rotational engine speed.

3. An arrangement for hydraulic tensioning and adjusting of a wind-around drive through which a first camshaft of a piston internal-combustion engine drives a second camshaft, comprising a hydraulic piston for changing the relative rotational position of the camshafts with respect to one another by adjustment of the drive by shifting a chain tensioning device transversely to the drive, while one of a loose end and a load end of the drive is lengthened and the other of the loose end and load end is shortened, wherein engine oil is used as hydraulic fluid for the hydraulic piston, and pressure of the fluid rises with rotational engine speed, and the engine oil pressure acts upon a control member which is under spring tension and which is shifted continuously corresponding to the rotational engine speed, and starting from a determinable rotational engine speed, exposes a duct communicating with the hydraulic piston so that the engine oil pressure can act upon the hydraulic piston.

4. The arrangement according to claim 3, wherein the control member is a control slide valve, which is prestressed by a coil spring and longitudinally guided in a control housing.

5. The arrangement according to claim 3, wherein the control member is a ball switch valve held in a closed position by a spring and, after the opening by the engine oil pressure, exposes a duct to communicate with the hydraulic piston.

6. The arrangement according to claim 4, wherein the control slide valve is supported by a disk spring configured so that a negatively descending curve segment thereof in a force-deflection characteristic is utilized for control the device.

* * * * *